US009543711B2

(12) United States Patent
Nakayama et al.

(10) Patent No.: US 9,543,711 B2
(45) Date of Patent: Jan. 10, 2017

(54) WIRING MODULE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Osamu Nakayama, Yokkaichi (JP); Mitsutoshi Morita, Yokkaichi (JP); Kotaro Takada, Yokkaichi (JP); Naoki Fukushima, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/773,999

(22) PCT Filed: Mar. 10, 2014

(86) PCT No.: PCT/JP2014/056128
§ 371 (c)(1),
(2) Date: Sep. 9, 2015

(87) PCT Pub. No.: WO2014/156580
PCT Pub. Date: Oct. 2, 2014

(65) Prior Publication Data
US 2016/0028194 A1    Jan. 28, 2016

(30) Foreign Application Priority Data
Mar. 27, 2013    (JP) .................. 2013-065650

(51) Int. Cl.
H01R 24/00    (2011.01)
H01R 13/66    (2006.01)
(Continued)

(52) U.S. Cl.
CPC ............. *H01R 13/6683* (2013.01); *G01K 1/14* (2013.01); *G01K 13/00* (2013.01); *H01M 2/1077* (2013.01); *H01M 2/206* (2013.01); *H01M 10/486* (2013.01)

(58) Field of Classification Search
CPC ............ H01R 13/6683; H01R 13/6666; H01M 2/206; H01M 10/486; H01M 2/1077
(Continued)

(56) References Cited

U.S. PATENT DOCUMENTS 8,545,271 B2 * 10/2013 Henmi ................ H01M 2/1083
439/208
2004/0043663 A1 * 3/2004 Ikeda .................... H01M 2/206
439/627
(Continued)

FOREIGN PATENT DOCUMENTS

JP    2010-282816 A    12/2010
JP    2012-154901 A    8/2012
(Continued)

Primary Examiner — Abdullah Riyami
Assistant Examiner — Harshad Patel
(74) Attorney, Agent, or Firm — Oliff PLC

(57) ABSTRACT

A wiring module includes an insulating protector that holds a connection member for connecting adjacent electrode terminals, and a temperature detecting member for detecting the temperature of the connection member. The temperature detecting member includes a temperature detecting element, an electric wire connected to the temperature detecting element, an element accommodating section in which the temperature detecting element is accommodated and through which the electric wire is led, and a detection section that is contiguous to the element accommodating
(Continued)

section and is arranged to be in contact with the connection member. The element accommodating section is arranged in parallel or perpendicular to the line connecting the shaft centers of two electrode terminals that are connected to each other by the connection member.

6 Claims, 15 Drawing Sheets

(51) Int. Cl.
*H01M 2/10* (2006.01)
*H01M 2/20* (2006.01)
*H01M 10/48* (2006.01)
*G01K 13/00* (2006.01)
*G01K 1/14* (2006.01)

(58) Field of Classification Search
USPC ........ 361/103, 106, 26, 27, 36, 37; 439/627, 439/504; 429/160, 121, 61
See application file for complete search history.

(56) References Cited

U.S. PATENT DOCUMENTS

| | | | |
|---|---|---|---|
| 2010/0309949 A1 | 12/2010 | Akaboshi et al. | |
| 2011/0223466 A1* | 9/2011 | Lee | H01M 2/1077 429/158 |
| 2012/0009447 A1 | 1/2012 | Ikeda et al. | |
| 2012/0161677 A1 | 6/2012 | Kunimitsu et al. | |
| 2012/0244397 A1* | 9/2012 | TenHouten | H01M 2/1005 429/61 |
| 2014/0141301 A1 | 5/2014 | Aoki | |
| 2014/0315441 A1* | 10/2014 | Kinoshita | H01M 2/1077 439/627 |
| 2014/0370342 A1* | 12/2014 | Nakayama | H01M 10/482 429/90 |

FOREIGN PATENT DOCUMENTS

| | | |
|---|---|---|
| JP | 2013-030312 A | 2/2013 |
| JP | 2013-137905 A | 7/2013 |
| JP | 2013-143272 A | 7/2013 |
| JP | 2013-248512 A | 12/2013 |
| WO | 2009/022521 A1 | 2/2009 |
| WO | 2011/024477 A1 | 3/2011 |

* cited by examiner

WIRING MODULE

CROSS-REFERENCE TO RELATED APPLICATIONS

This application is a National Stage application of International Application No. PCT/JP2014/056128, filed on Mar. 10, 2014, and claims priority to Japanese Patent Application No. 2013-065650 filed on Mar. 27, 2013, the disclosures of both of which are incorporated herein by reference in their entireties.

TECHNICAL FIELD

Embodiments of the present application relate to a wiring module.

BACKGROUND

In power storage modules such as electric cars or hybrid cars, a large number of power storage elements are lined up laterally and connected to each other in order to increase an output. The power storage elements are configured to be connected in series or in parallel to each other by adjacent electrode terminals being connected by connection members such as busbars.

If such a power storage module is used in a high temperature condition, the lifetime thereof may be decreased, and a power storage module in which a plurality of lithium-ion batteries or the like are connected to each other may ignite due to an increase in its temperature when being charged. Accordingly, in order to prevent such a situation, power storage modules are provided with a temperature sensor for detecting the temperature of power storage elements (see JP 2012-154901A, for example).

SUMMARY OF THE INVENTION

In a temperature sensor disclosed in JP 2012-154901A, a resilient portion is molded by insert molding into one piece with a resin module that is attached to a power storage element group constituted by a plurality of power storage elements, and the temperature sensor is mounted so as to be in contact with the main bodies of the power storage elements by the resin module being attached to the power storage elements.

However, in the configuration disclosed in JP 2012-154901A, the resin module needs to be produced depending on the position where the temperature sensor is installed, the number thereof, or the like.

The present application was made in view of the above-described circumstances, and it is an object of the present application to provide a wiring module that has a high degree of freedom in the position where a temperature detecting member such as a temperature sensor is installed, the number thereof, and the like.

In order to solve the above-described problems, embodiments of the present application are directed to a wiring module to be attached to a power storage element group in which a plurality of power storage elements are lined up, each power storage element having a positive electrode terminal and a negative electrode terminal, the wiring module including: an insulating protector configured to hold a connection member that electrically connects adjacent positive and negative electrode terminals; and a temperature detecting member configured to detect the temperature of the connection member, wherein the temperature detecting member includes: a temperature detecting element; an electric wire connected to the temperature detecting element; an element accommodating section in which the temperature detecting element is accommodated and through which the electric wire is led out; and a detection section that is contiguous to the element accommodating section and that is arranged to be in contact with the connection member, and the element accommodating section being arranged in parallel or perpendicular to a line connecting shaft centers of the two electrode terminals that are connected to each other by the connection member.

According to the embodiments of the present application, the temperature detecting member includes a temperature detecting element, an electric wire connected to the temperature detecting element, an element accommodating section in which the temperature detecting element is accommodated and through which the electric wire is led out, and a detection section that is contiguous to the element accommodating section and is arranged to be in contact with the connection member.

In the embodiments of the present application, in order to install the temperature detecting member, the detection section of the temperature detecting member is arranged so as to be in contact with the connection member serving as a detection target, and the element accommodating section is arranged in parallel or perpendicular to the line connecting shaft centers of electrode terminals that are connected to each other by the connection member.

In other words, according to the embodiments of the present application, after the connection member is held by the insulating protector, it is possible to install the temperature detecting member at a desired position, thus achieving a high degree of freedom in the position at which the temperature detecting member is installed, the number thereof, and the like.

Meanwhile, in the configuration in which the electric wire connected to the temperature detecting element is led out in the direction perpendicular to the line connecting shaft centers of adjacent two electrode terminals, it is necessary to take into consideration a space needed for taking out an electric wire to be connected to the temperature detecting element, or the like, preventing an increase in size of the holding section for holding the connection member of the insulating protector.

However, since embodiments of the present application have the configuration in which the element accommodating section is arranged in parallel or perpendicular to the line connecting shaft centers of electrode terminals, it is possible to arrange the element accommodating section outside the connection member holding section, or arrange the element accommodating section so that it overlaps the connection member, suppressing an increase in size of the holding section.

Embodiments of the present application may also have the following configuration.

The detection section is plate-shaped, and the temperature detecting member is configured such that, when one surface of the detection section is arranged on the connection member side, the detection section and the connection member are capable of being in contact with each other, and when the other surface opposite to the one surface of the detection section is arranged on the connection member side, the detection section and the connection member are capable of being in contact with each other.

With such a configuration, it is possible to use the temperature detecting member in both cases where the one surface of the detection section is arranged on the connection member side and where the opposite surface of the detection section is arranged on the connection member side, eliminating the need to prepare various types of temperature detecting members taking into consideration the arrangement position, the direction in which the electric wires are routed, or the like.

The insulating protector may be provided with a receiving groove that receives the element accommodating section so that the detection section is arranged in areal contact with the connection member.

For example, in the case where the element accommodating section has a thickness larger than that of the detection section, it is concerned that if the element accommodating section is arranged at a position at the same level as or higher level than the connection member, the detection section will be raised from the connection member and the contact area is reduced, deteriorating the temperature detection accuracy. Therefore, with the above-described configuration, the element accommodating section is received by the receiving groove of the insulating protector, and the detection section is arranged in surface-contact with the connection member, making it possible to prevent the accuracy in temperature detection from being reduced.

According to embodiments of the present application, it is possible to provide a wiring module that has a high degree of freedom in the position where a temperature detecting member is installed, the number thereof, and the like.

DETAILED DESCRIPTION

Embodiment 1

Figure 1:
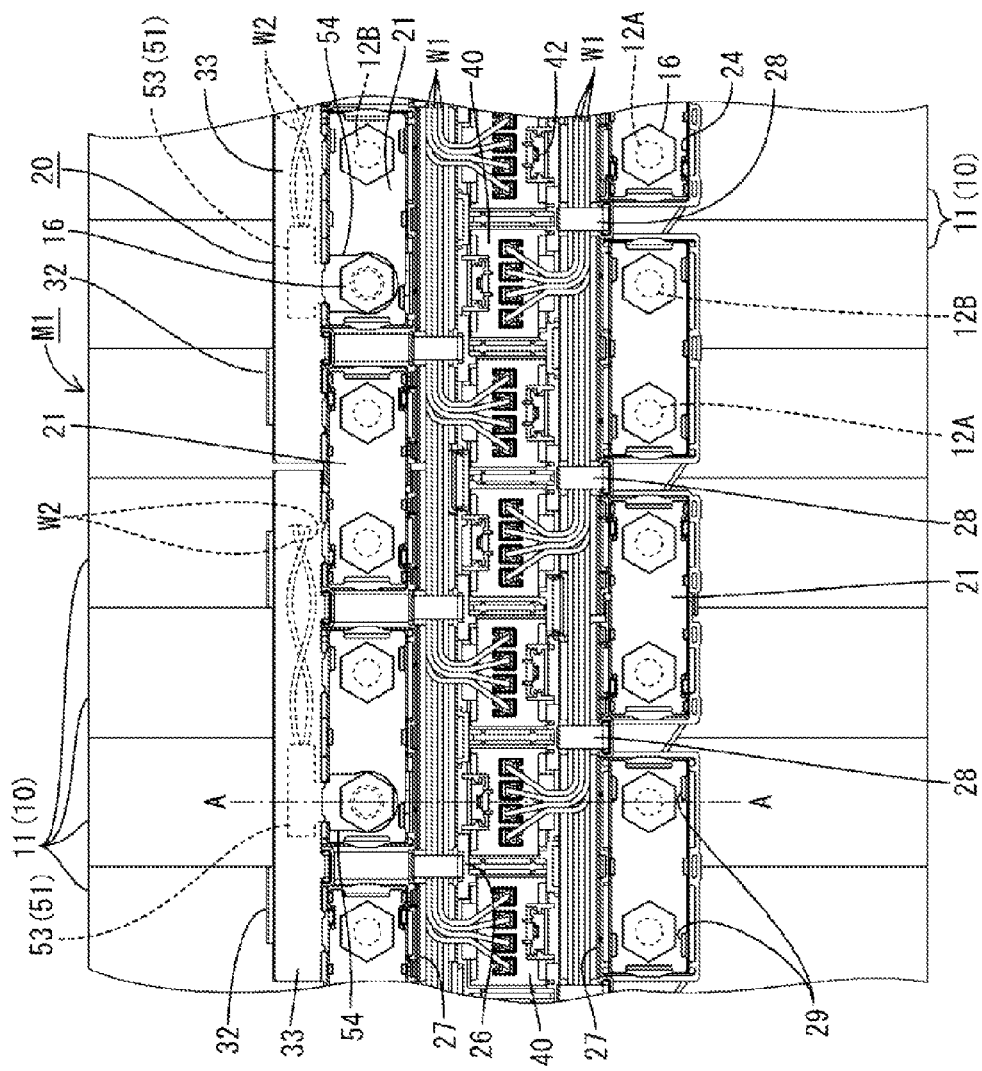
FIG. 1 is a partial plan view illustrating a battery module to which a wiring module according to Embodiment 1 is attached.

Embodiment 1 of the present application will be described with reference to FIGS. 1 to 11. A battery module M1 (an example of a power storage module) according to the present embodiment is mounted on a vehicle (not shown) such as an electric car or hybrid car, and is used as an electric power source for driving the vehicle.

The battery module M1 includes a single cell group 10 (an example of a power storage element group) in which a plurality of cell packs 11 (an example of a power storage element) are lined up, and a wiring module 20 that is attached to the single cell group 10. In the following description, if there are a plurality of the same members, a reference numeral may be given to one member and be omitted for the other members.

Single Cell Group 10

As shown in FIG. 1, the battery module M1 of the present embodiment includes the single cell group 10 in which a plurality of cell packs 11 are lined up, the plurality of cell packs each including four single cells (not shown) connected in series to each other. In the present embodiment, each single cell is a thin laminated-type single cell and accommodates a power generating element therein.

Each cell pack 11 has a flat and substantially rectangular parallelepiped shape, and electrode terminals 12A and 12B, which are positive and negative electrodes, are formed projecting from the upper surface of this cell pack, as show in FIG. 1. The positive electrode terminal 12A and the negative electrode terminal 12B have the same shape and size. Each of the electrode terminals 12A and 12B has the shape of a hole, and has a thread (not shown) into which the thread of a bolt 16 can be screwed to connect the corresponding electrode terminal to a connection member 21 (described later). The plurality of cell packs 11 are arranged such that adjacent electrode terminals 12A and 12B have different polarities.

Figure 2:
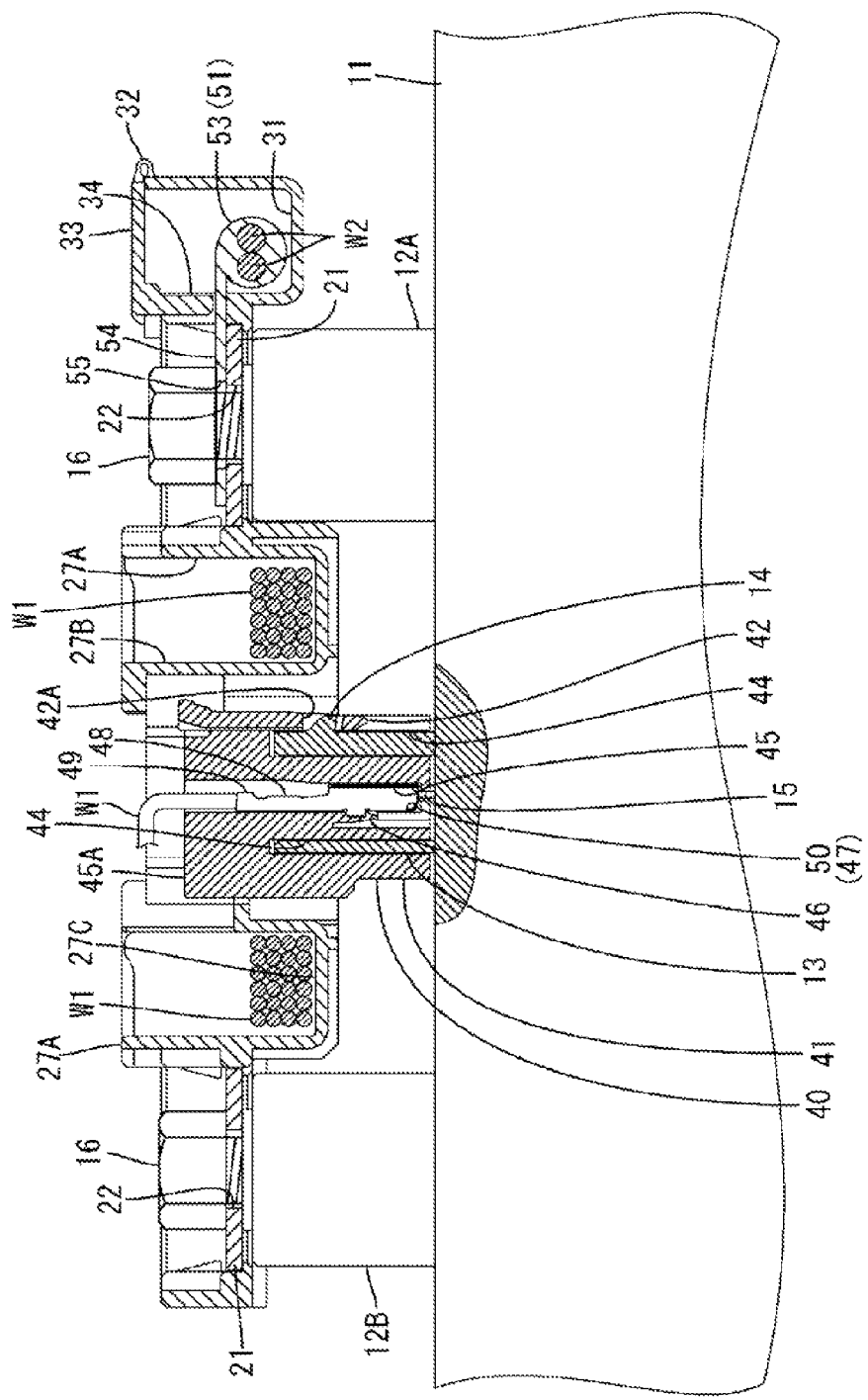
FIG. 2 is a partial cross-sectional view taken along the line A-A of FIG. 1.

As shown in FIG. 2, a tubular connector section 13 that opens upward is provided between the positive electrode terminal 12A and the negative electrode terminal 12B. The outer wall of the connector section 13 is provided with a latching protrusion 14 for latching a connector 40 (fitting counterpart), as shown in FIG. 2.

In each connector section 13, male terminals 15 connected to the corresponding single cells are arranged protruding. That is, in one connector section 13, four terminals 15 are protruding. The four terminals 15 arranged in the connector section 13 are configured to be electrically connected to terminals 47 of the counterpart connector 40.

Wiring Module 20

The wiring module 20 includes a plurality of metal connection members 21 that are connected to the positive electrode terminal 12A and the negative electrode terminal 12B of adjacent cell packs 11, an insulating protector 23 that is made from an insulating resin and includes connection member holding sections 24 for holding the connection members 21, and temperature detecting members 51 for detecting the temperature of the connection members 21.

Connection Member 21

Figure 4:
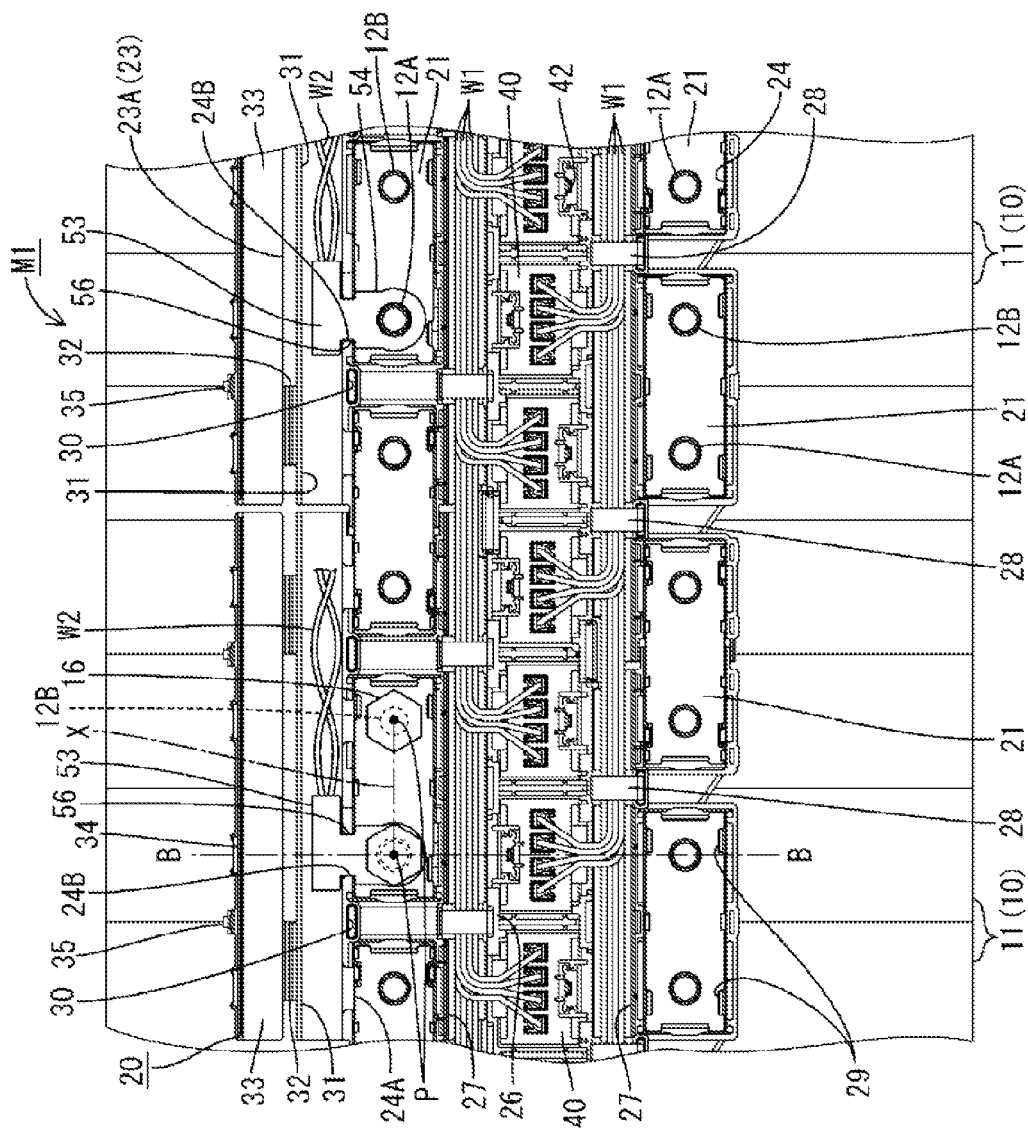
FIG. 4 is a partial plan view illustrating the battery module including the wiring module with its flaps open.
Figure 5:
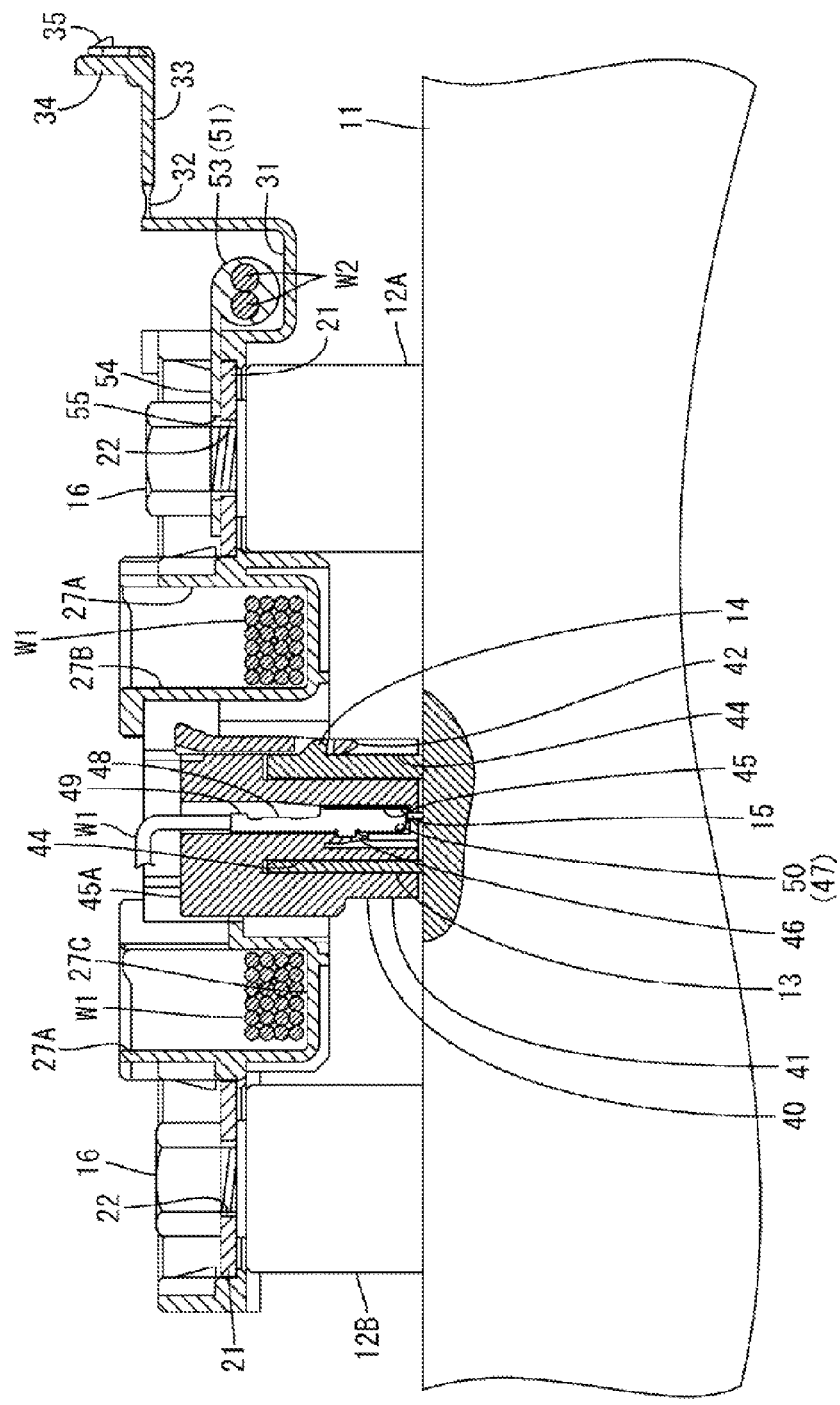
FIG. 5 is a partial cross-sectional view taken along the line B-B of FIG. 4.
Figure 6:
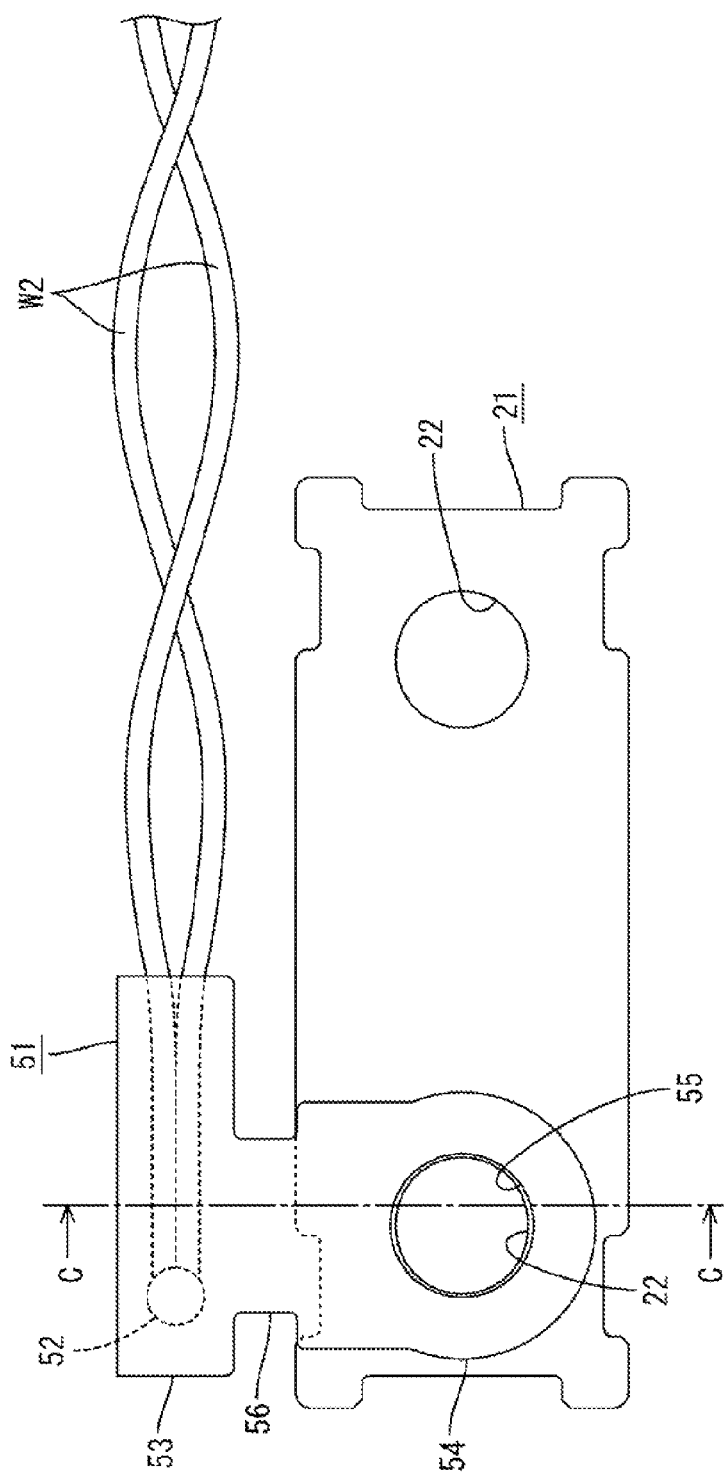
FIG. 6 is a partial plan view illustrating a temperature detecting member.

Each connection member 21 is formed by pressing a plate material made of metal such as copper, copper alloy, stainless steel (SUS), aluminum, or the like into a predetermined shape and on the whole has a substantially rectangular shape, as shown in FIGS. 4 and 6. The surface of the connection member 21 may be plated with metal such as tin or nickel. The connection member 21 has a pair of terminal through-holes 22 that are substantially circular and through which the bolts 16 for connecting the connection member to the electrode terminals 12A and 12B are inserted, the terminal through-holes 22 penetrating through the connection member 21.

The terminal through-holes 22 have a hole diameter that is set to be slightly larger than that of the electrode terminals 12A and 12B. By the bolts 16 being inserted into the terminal through-holes 22 and the threads of the bolts 16 being screwed into the holes of the electrode terminals 12A and 12B so as to sandwich the connection member 21 between the heads of the bolts 16 and terminal blocks, the adjacent electrode terminals 12A and 12B, and the connection member 21 are electrically connected to each other.

Note that a connection member 21 that is a target for temperature detection is configured to be sandwiched, together with a detection section 54 of a temperature detecting member 51, between the heads of bolts 16 and terminal blocks.

Insulating Protector 23

The insulating protector 23 is formed by coupling a plurality of coupling units 23A, and has an elongated shape extending in the direction (the horizontal direction in FIG. 1) in which the cell packs 11 are lined up, as shown in FIG. 1. In the insulating protector 23, a plurality of connection member holding sections 24 are provided in an arrangement of two lines in the longitudinal direction, the connection member holding sections 24 opening upward and including a separation wall that separates the inside from the outside and is capable of holding the connection member 21. Each connection member holding section 24 is provided with a plurality of pressing pieces 29 for preventing the corresponding connection member 21 from being removed upward.

Of the connection member holding sections 24 arranged in two lines, the connection member holding sections 24 that are arranged to the rear of FIG. 4 each have an outer wall 24A that partially has a cutout at a position that corresponds to the position of the electrode terminal 12A or 12B. The cutout of the outer wall 24A of the corresponding connection member holding section 24 serves as a detection member holding section 24B for holding a held section 56, which is formed between an element accommodating section 53 and the detection section 54 of the temperature detecting member 51 and has a width smaller than that of the detection section 54.

Furthermore, with respect to the connection member holding sections 24 that are arranged to the rear of FIG. 4, flap latching holes 30 are provided between adjacent connection member holding sections 24. Flap sections 33 of receiving grooves 31 are latched into the flap latching holes 30.

Furthermore, as shown in FIG. 4, the receiving grooves 31 for receiving the element accommodating section 53 of the temperature detecting member 51 are provided outside the connection member holding sections 24 arranged to the rear of FIG. 4.

Each receiving groove 31 is formed extending in the direction (the horizontal direction in the drawing) in which the cell packs 11 are lined up. In the receiving groove 31, as shown in FIG. 4, the element accommodating section 53 and electric wires W2 that are led out from the element accommodating section 53 are arranged. The receiving groove 31 opens upward, and has a flap section 33 for covering this opening section, the flap section 33 being provided via hinges 32.

The flap section 33 is provided along the receiving groove 31, and has, on that part of flap section 33 that corresponds to the detection member holding section 24B, a projecting restricting wall 34 that is fitted into the detection member holding section 24B and presses the temperature detecting member 51 from above so as to restrict movement of the temperature detecting member 51. The flap section 33 has lock protrusions 35 that are latched into the flap latching holes 30 formed between adjacent connection member holding sections 24.

Connector holding sections 26 are provided between the connection member holding sections 24 arranged in two lines, and electric wire accommodating grooves 27 are provided between the connector holding sections 26 and each line of the connection member holding sections 24.

The electric wire accommodating grooves 27 are configured to accommodate electric wires W1 connected to ends on one side of the terminals 47 that are accommodated in terminal accommodating sections 45 of the connectors 40 that are held by the connector holding sections 26.

As shown in FIG. 4, each of the two electric wire accommodating grooves 27 has a pair of groove-wall sections 27A and 27B, and a bottom 27C that connects the pair of groove-wall sections 27A and 27B, and is capable of accommodating a plurality of electric wires W1 therein.

Furthermore, electric wire fixing sections 28 are provided on the upper edges of the electric wire accommodating groove 27, the electric wire fixing sections 28 restricting protrusion of the electric wires W1 from the electric wire accommodating groove 27 and extending from one groove-wall section 27A to the other groove-wall section 27B. Each electric wire fixing section 28 is provided at a position between adjacent connection member holding sections 24.

In the present embodiment, the connector holding sections 26 are provided between the two electric wire accommodating grooves 27. The shape of each connector holding section 26 extends along the outer periphery of a connector 40.

Connector 40

As shown in FIG. 1, the connector 40 held by the connector holding section 26 is configured to accommodate four terminals 47. The connector 40 is provided with a housing 41 in the shape of a substantially rectangular parallelepiped, and four terminals 47 housed in the housing 41.

The housing 41 is provided with a latching piece 42, which receives the latching protrusion 14 of the connector section 13 and is latched with respect to a single cell. The latching piece 42 has a latching hole 42A into which the latching protrusion 14 is fitted.

The housing 41 has a groove section 44 that receives the connector section 13. In the housing 41, four terminal accommodating sections 45 are formed in parallel to each other. Each terminal accommodating section 45 has, on its inner circumferential surface, a lance 46 that flexibly protrudes into the terminal accommodating section 45 and thereby engages with a terminal 47 accommodated in the terminal accommodating section 45.

The terminals 47 housed in the housing 41 are so-called female-type terminals 47, and each have, on one end (upper end in FIG. 2) thereof, barrel sections 48 and 49 to which the electric wires W1 are connected and, on the other end (lower end in FIG. 2) thereof, a connection section 50 that is box-shaped and connectable to a single cell.

The barrel sections 48 and 49 encompasses a wire barrel section 48 that is crimped to an exposed core wire (not shown) exposed at an end of an electric wire W1, and an insulation barrel section 49 that is crimped to a part of the electric wire W1 that is covered with an insulation covering, although the details thereof are not shown in the drawings.

The connection section 50 is provided with elastic contact pieces (not shown), and by the elastic contact pieces being brought into contact with the terminals 15 of the connector section 13, the single cell and the terminals 47 of the connector 40 are electrically connected to each other. Furthermore, an engagement section (not shown) that engages with the lance 46 is provided between the connection section 50 and the barrel sections 48 and 49 of the terminals 47.

The terminals 47 accommodated in the connector 40 are terminals 47 for detecting the voltage of a single cell. The electric wires W1 connected to the terminals 47 are led out from a rear wall 45A (the wall section arranged on the upper side of FIG. 2) of the terminal accommodating section 45 to the outside of the housing 41, and are connected to, for example, a control unit (not shown) such as an ECU. The electric wires W1 are arranged in the electric wire accommodating groove 27 located on the side opposite to the latching piece 42 of the housing 41.

Temperature Detecting Member 51

Meanwhile, in the present embodiment, a temperature detecting member 51 is provided, as shown in FIG. 4. The temperature detecting member 51 includes an element accommodating section 53, which accommodates a temperature detecting element 52 and through which an electric wire W2 is led, and a detection section 54.

The element accommodating section 53 is formed into a tube by bending a metal plate material that is continuous from the detection section 54, and accommodates therein the temperature detecting element 52 to which electric wires W2 are connected. The temperature detecting element 52 is constituted by a thermistor, for example. A PTC thermistor or an NTC thermistor may suitably be selected as the thermistor. Furthermore, the temperature detecting element 52 is not limited to a thermistor, and any element may suitably be selected as long as it can detect temperatures.

A pair of electric wires W2 are connected to the temperature detecting element 52, and are led from the element accommodating section 53 to the outside. The electric wires W2 are connected to an external circuit (not shown) and a signal from the temperature detecting element 52 is transmitted to the external circuit via the electric wires W2. The external circuit is arranged in, for example, a battery ECU (not shown), and is configured to detect the temperature of the connection member 21 based on the signal from the temperature detecting element 52.

The detection section 54 is flat-plate shaped, and the held section 56, which is formed between the element accommodating section 53 and the detection section 54 and has a width smaller than that of the detection section 54, is a part that is held by the detection member holding section 24B formed in the insulating protector 23. The detection section 54 and the element accommodating section 53 are connected to each other via the held section 56.

The detection section 54 has a terminal insertion hole 55 through which the electrode terminal 12A or 12B can be inserted. The electrode terminal 12A or 12B is configured to be inserted into a hole that is formed by the terminal insertion hole 55 of the detection section 54 overlapping the terminal through-hole 22 of the connection member 21.

Figure 7:
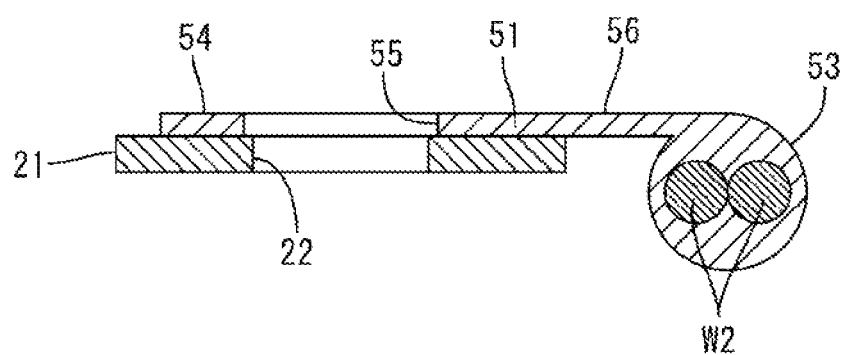
FIG. 7 is a cross-sectional view taken along the line C-C of FIG. 6.

As shown in FIG. 7, the element accommodating section 53 has a thickness that is larger than that of the detection section 54. In the present embodiment, the element accommodating section 53 is arranged in parallel to a line X (see FIG. 4) connecting the shaft centers P of adjacent two electrode terminals 12A and 12B that are connected to each other by the connection member 21.

The temperature detecting member 51 according to the present embodiment is produced by processing a plate material made of metal such as copper, copper alloy, stainless steel (SUS), aluminum, or the like. The temperature detecting member 51 is produced by a method in which, for example, a metal plate material is pressed into a predetermined shape, the resultant material is subjected to bending or the like so as to form a tubular element accommodating section 53, the temperature detecting element 52 to which electric wires W2 are connected is put into the element accommodating section 53, and an insulating resin (for example, an epoxy resin) is then cast into the element accommodating section 53 and is fixed.

Method for Assembling the Wiring Module 20

When the wiring module 20 according to the present embodiment is assembled, the connection members 21 are first accommodated in the connection member holding sections 24 of the insulating protector 23.

Then, the terminals 47 to one end of which electric wires W1 are connected are accommodated in the terminal accommodating sections 45 of the connectors 40, and the connectors 40 are attached to the connector holding sections 26 by being fitted into the connector holding sections 26.

Figure 8:
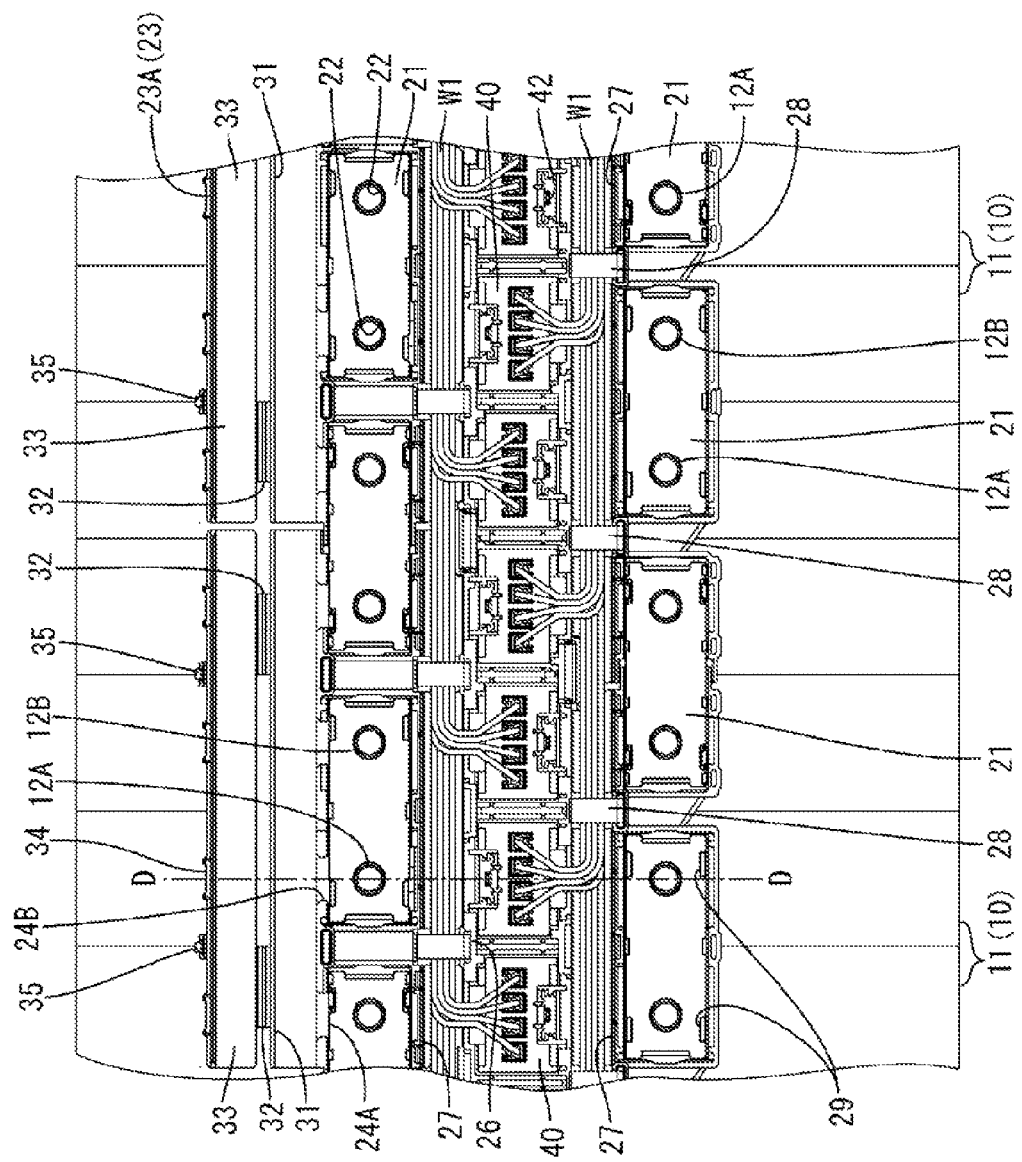
FIG. 8 is a partial plan view illustrating the state in which the wiring module is arranged on a single cell group.
Figure 9:
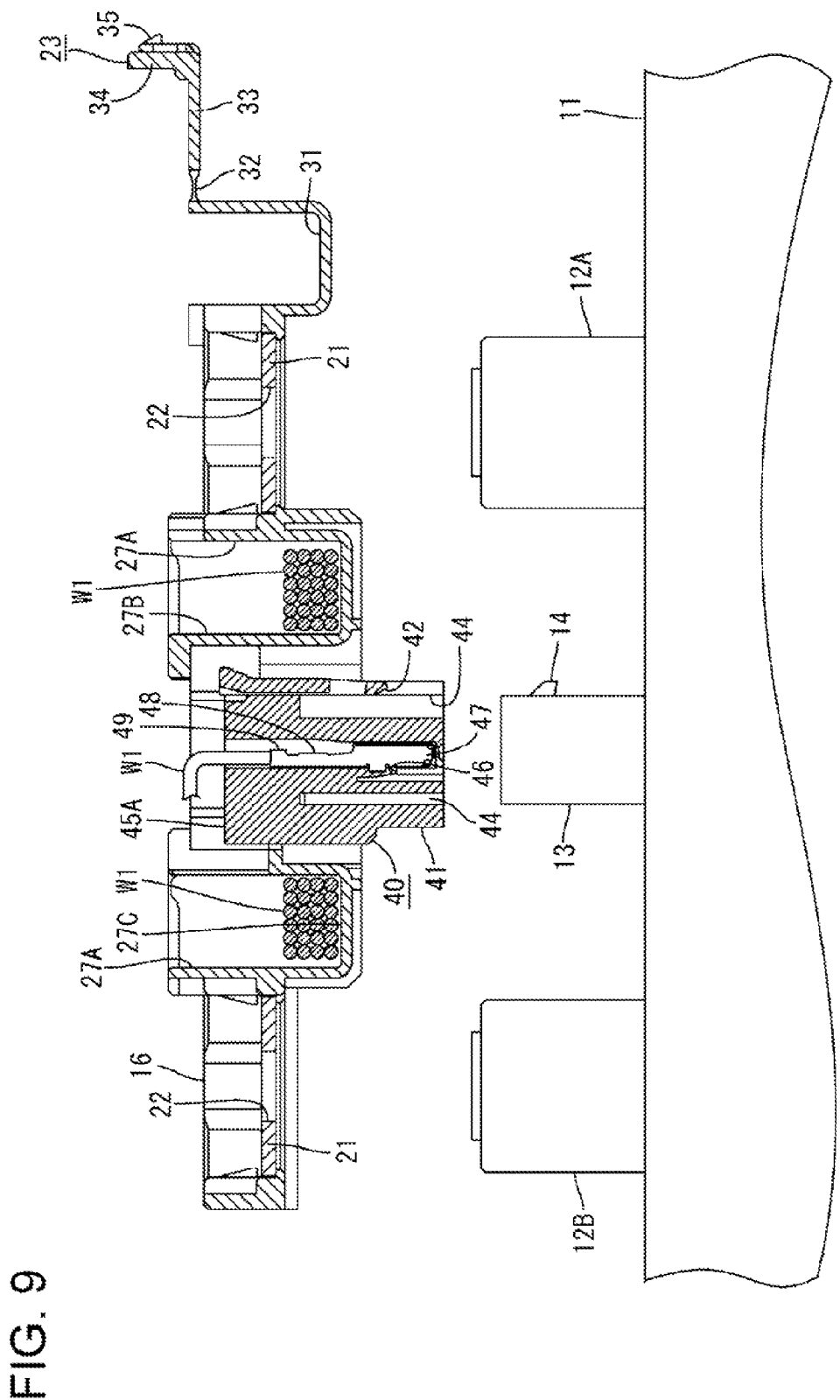
FIG. 9 is a partial cross-sectional view taken along the line D-D of FIG. 8.

Then, the electric wires W1 connected to the connectors 40 are accommodated in the electric wire accommodating grooves 27 (see FIGS. 8 and 9). When accommodating the electric wires W1, electric wires W1 are accommodated in the electric wire accommodating groove 27 that is located on the side opposite to the latching piece 42 of the housing 41 of the connector 40 to which those electric wires W1 are connected.

Then, the temperature detecting members 51 are attached. While the element accommodating sections 53 of the temperature detecting members 51 are positioned so as to align with the corresponding receiving groove 31 and the terminal insertion holes 55 of the detection sections are arranged so as to overlap the terminal through-holes 22 of the connection members 21, the held sections 56 are fitted into the detection member holding sections 24B of the insulating protector 23.

Accordingly, the held sections 56 are fitted into the detection member holding sections 24B of the insulating protector 23, the element accommodating sections 53 are received by the receiving groove 31, and the detection sections 54 and the connection members 21 are brought into surface-contact with each other. Note that the electric wires W2 connected to the temperature detecting elements 52 are routed in the receiving grooves 31.

Figure 3:
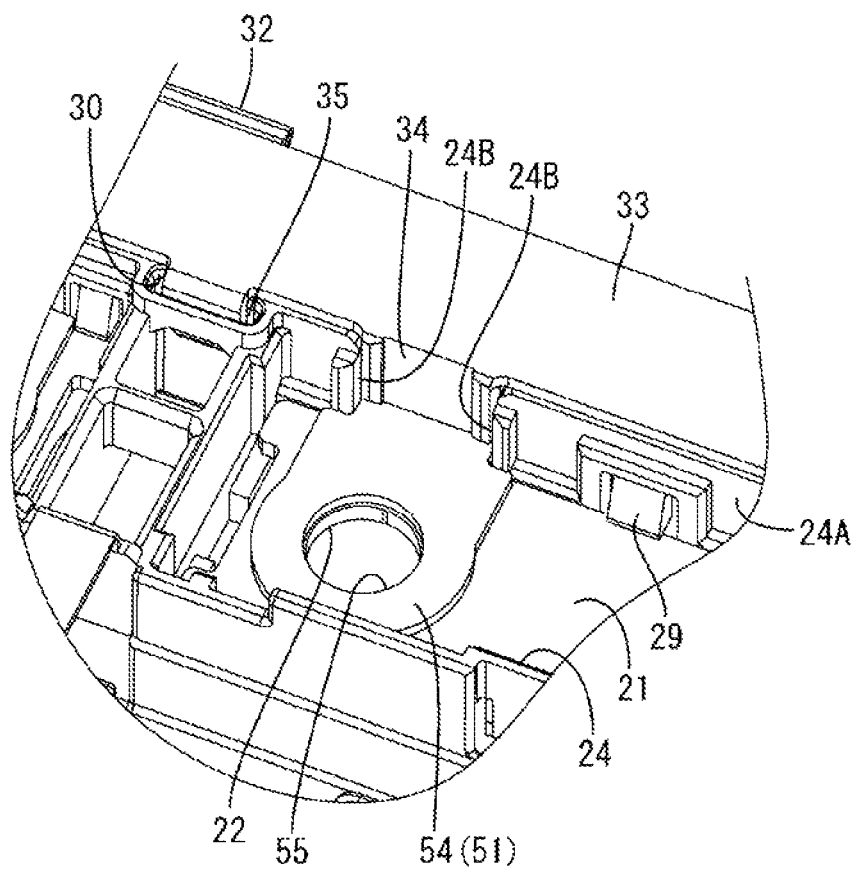
FIG. 3 is a partial perspective view illustrating the battery module.

Then, when the flap sections 33 are folded at the hinges 32 to close the receiving grooves 31, the restricting walls 34 of the flap sections 33 are fitted into the detection member holding sections 24B to press the temperature detecting members 51 from above, thereby restricting the (upward) movements of the temperature detecting members 51 (see FIGS. 2 and 3). Then, the lock protrusions 35 of the flap sections 33 are latched into the flap latching holes 30 formed between adjacent connection member holding sections 24.

Method of Attaching to the Single Cell Group 10

A plurality of cell packs 11 are lined up so that adjacent electrode terminals 12A and 12B have different polarities, and the wiring module 20 in which the temperature detecting members 51, the connection members 21, and the connectors 40 are arranged is attached so as to cover the surfaces of the cell packs 11 on which the electrode terminals 12A and 12B are formed, with the terminal through-holes 22 of the connection members 21 aligned with the electrode terminals 12A and 12B. Accordingly, the connector sections 13 of the cell packs 11 are arranged in the connector holding sections 26.

Then, the battery connecting bolts 16 are connected to the sections in the shape of holes of the electrode terminals 12A and 12B inserted through the connection members 21 and the detection section 54. After all the bolts 16 are connected thereto, the connectors 40 are pressed down to realize the state in which the connectors 40 and the single cells are electrically connected (see FIG. 5). When the process for connecting the bolts 16 and the process for connecting the connectors 40 end, the battery module M1 is completed.

Functions and Effects of the Present Embodiment

In the present embodiment, in order to install the temperature detecting member 51, the detection section 54 of the temperature detecting member 51 is arranged so as to be in contact with the connection member 21 serving as a detection target, and the element accommodating section 53 is arranged in parallel to the line X connecting the shaft centers P of the electrode terminals 12A and 12B that are connected to each other by the connection member 21.

That is, according to the present embodiment, after the connection members 21 are held by the insulating protector 23, the temperature detecting members 51 can be installed at desired positions, thus achieving a high degree of freedom in the positions at which the temperature detecting members 51 are installed, the number thereof, and the like.

Furthermore, according to the present embodiment, since the element accommodating section 53 is arranged in parallel to the line X connecting the shaft centers P of the electrode terminals 12A and 12B, it is possible to arrange the element accommodating section 53 through which electric wires W2 are led outside the connection member holding sections 24, suppressing an increase in size of the connection member holding sections 24.

Furthermore, according the present embodiment, the detection section 54 of the temperature detecting member 51 is connected, together with the connection member 21, to the electrode terminals 12A and 12B, thus achieving an excellent work efficiency of the connecting procedure.

Furthermore, according to the present embodiment, the insulating protector 23 is provided with the receiving grooves 31 that receives the element accommodating section 53 so that the detection section 54 is arranged in surface-contact with the connection member 21, making it possible to prevent the temperature detection accuracy from being deteriorated.

Figure 10:
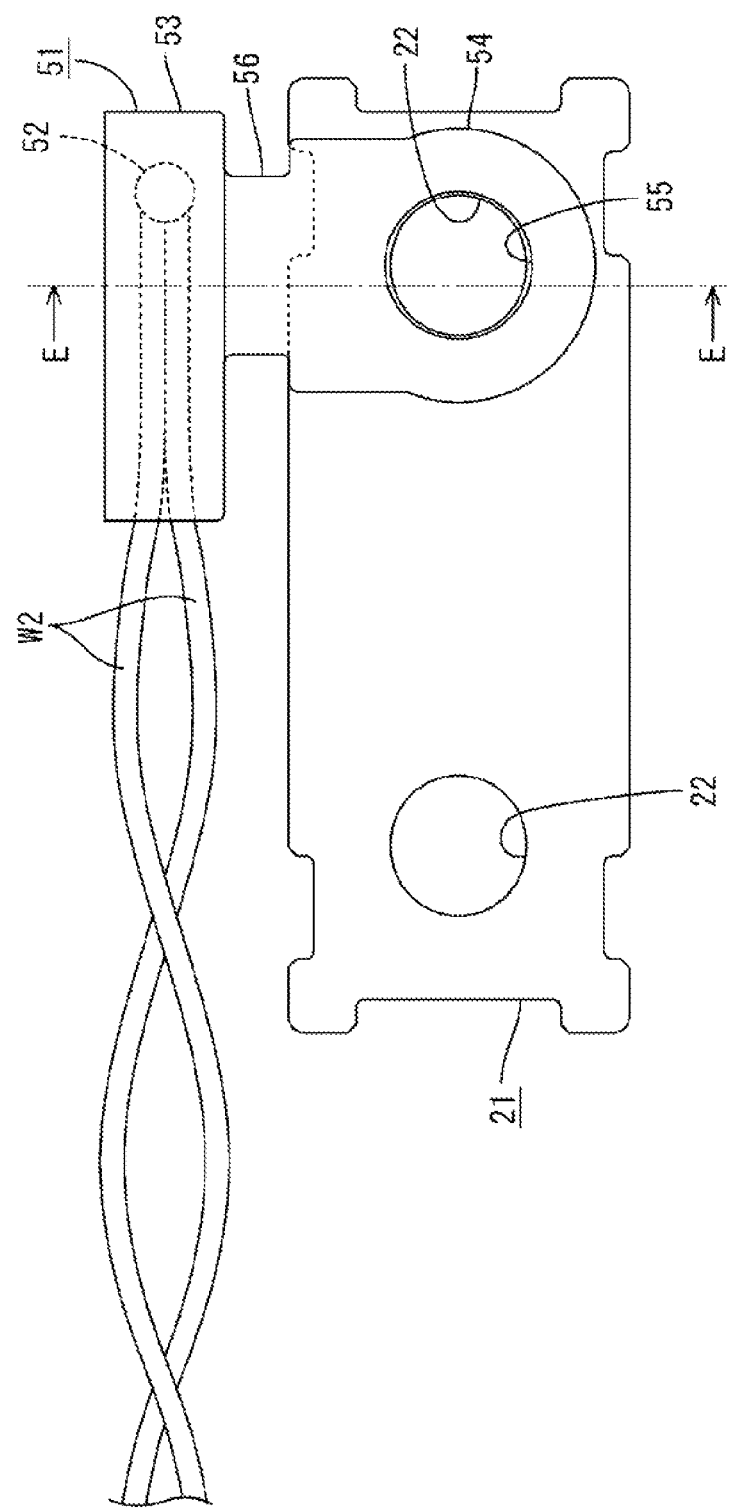
FIG. 10 is a partial plan view illustrating the case of use where the temperature detecting member illustrated in FIG. 6 is reversed.
Figure 11:
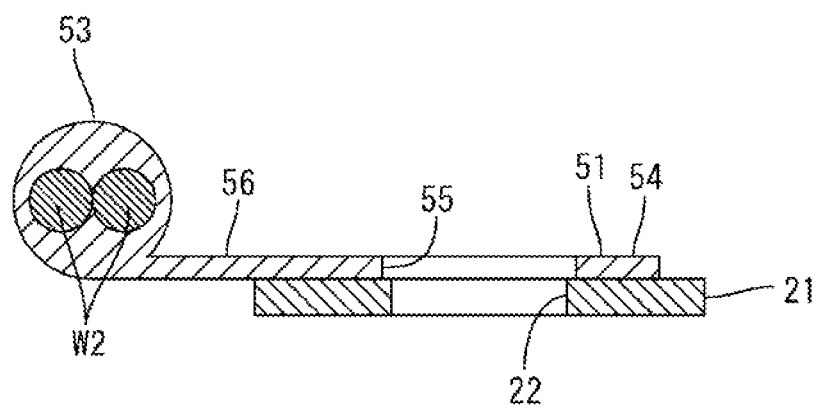
FIG. 11 is a cross-sectional view taken along the line E-E of FIG. 10.

Note here that even if the temperature detecting member 51 used in the present embodiment is used in a state of being reversed as shown in FIG. 10, it will be possible for the detection section 54 to be in surface-contact with the connection member 21, as shown in FIG. 11. Therefore, by using the temperature detecting members 51 used in the present embodiment, there is no need to prepare various types of temperature detecting members 51 taking into consideration the arrangement position, the method for routing the electric wires W, or the like.

Embodiment 2

Hereinafter, Embodiment 2 of the present application will be described with reference to FIGS. 12 to 14. A battery module M2 according to the present embodiment differs from the battery module of Embodiment 1 in the shape of an insulating protector 63 and the direction in which the temperature detecting members 51 are arranged. The same reference numerals are given to the same structures as those of Embodiment 1, and redundant descriptions thereof are omitted.

Connection member holding sections 64 in two lines that are formed in the insulating protector 63 are each provided with a rectangular outer wall 64A that surrounds a connection member 61 and the outer wall 64A partially has a cutout formed in a short side of the wall. The cutout of the outer wall 64A of the corresponding connection member holding section 64 serves as a detection member holding section 64B configured to hold the held section 56, which is formed between the element accommodating section 53 and the detection section 54 of the temperature detecting member 51 and has a width smaller than that of the detection section 54.

Figure 12:
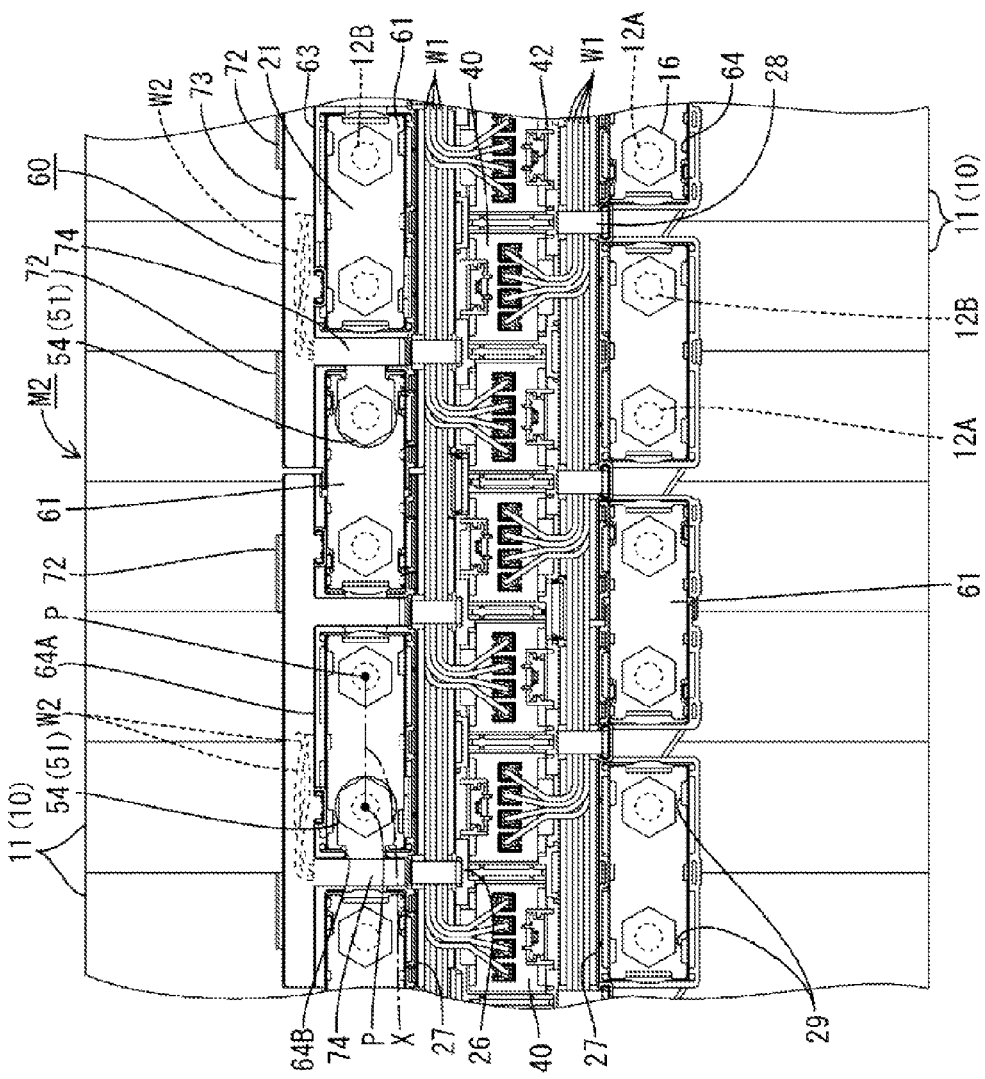
FIG. 12 is a partial plan view illustrating a battery module to which a wiring module according to Embodiment 2 is attached.

The connection member holding sections 64 lined up to the rear of FIG. 12 each have a flap latching hole 70, into which the flap section 73 is latched, on the externally arranged wall of a pair of walls in the long side direction of the outer wall 64A.

Furthermore, a receiving groove 71 for receiving the element accommodating section 53 of the temperature detecting member 51 is formed between adjacent connection member holding sections 64 of the connection member holding sections 64 arranged to the rear of FIG. 12. The receiving groove 71 is formed in the direction that is perpendicular to the direction in which the cell packs 11 are lined up (the horizontal direction of the drawing).

In the present embodiment, the receiving groove 71 is contiguous to a detecting wire accommodation section 77 in which electric wires W2 connected to a temperature detecting member 51 are routed. Note that an electric wire leading hole 78 is provided between the receiving groove 71 and the detecting wire accommodation section 77. At the end opposite to the electric wire leading hole 78 of the receiving groove 71, a flap latching recess 79 into which an element pressing section 74 of the flap section 73 is latched is provided.

Figure 13:
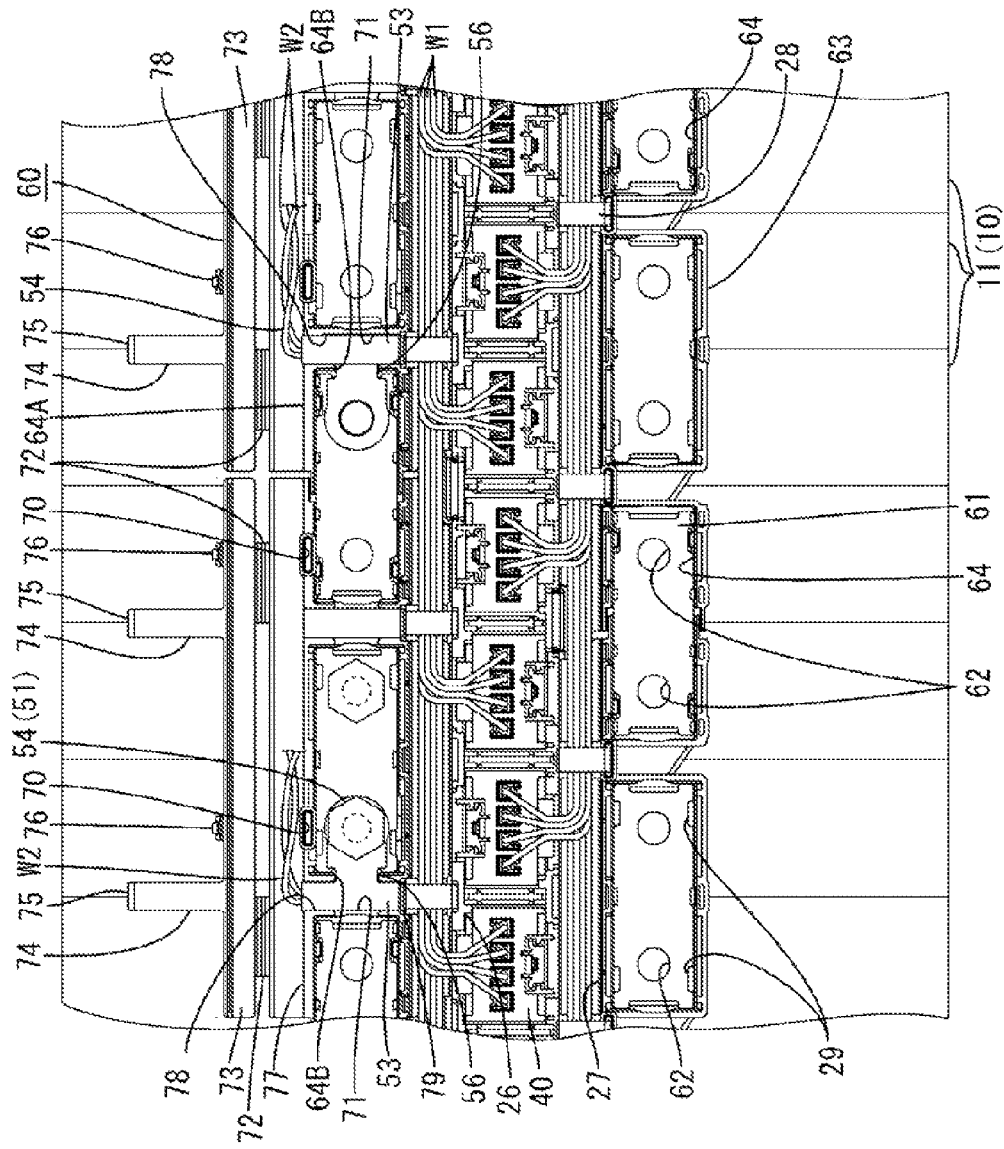
FIG. 13 is a partial plan view illustrating the battery module including the wiring module with its flaps open.

The detecting wire accommodation section 77 extends in the direction perpendicular to the receiving groove 71 (direction in which the cell packs are lined up), and accommodates, as shown in FIG. 13, the electric wires W2 led out from the element accommodating section 53. The detecting wire accommodation section 77 opens upward, and a flap section 73 that covers this open section is provided via hinges 72.

The flap section 73 is provided along the detecting wire accommodation section 77, and is provided with a lock protrusion 76 that is latched into the flap latching hole 70 formed in the outer wall 64A of the connection member holding section 64. The flap section 73 has the element pressing section 74 that covers the upper side of the receiving groove 71 and restricts the vertical direction movement of the element accommodating section 53. At an end of the element pressing section 74, a pressing projection 75 that is latched into the flap latching recess 79 provided on an end of the receiving groove 71 is provided.

The temperature detecting member 51 has the same shape as that of Embodiment 1, but is arranged in a direction different from that of Embodiment 1. In the present embodiment, the element accommodating section 53 is arranged perpendicular to the line X (see FIG. 12) connecting the shaft centers P of two adjacent electrode terminals 12A and 12B that are connected to each other by the connection member 61. In the present embodiment, the temperature detecting member 51 that is arranged on the right side of FIG. 13 is a temperature detecting member that is obtained by reversing a temperature detecting member 51 having the same shape as that of the temperature detecting member 51 arranged on the left side of the drawing and arranging the reversed temperature detecting member 51.

Figure 14:
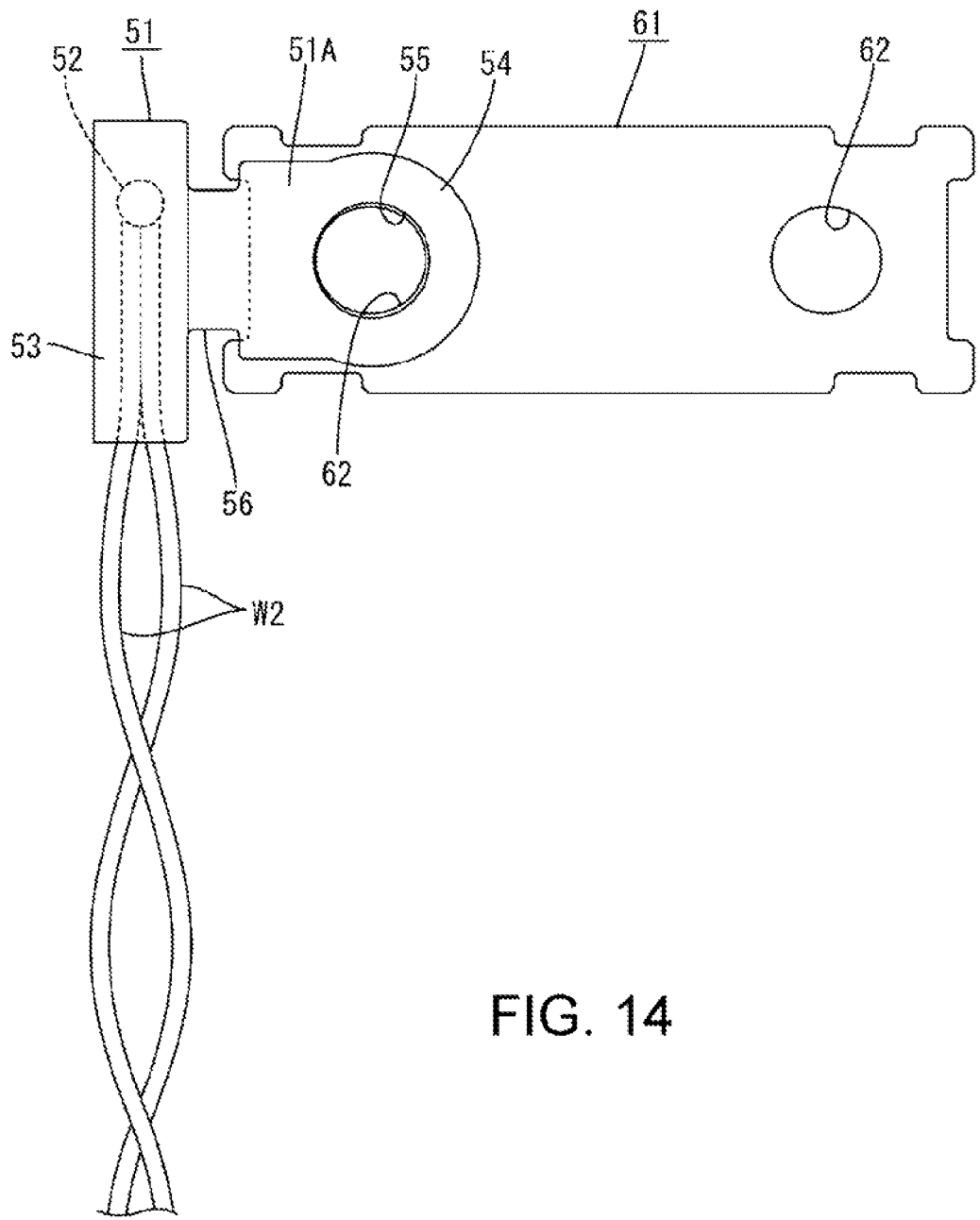
FIG. 14 is a partial plan view illustrating a temperature detecting member.
Figure 15:
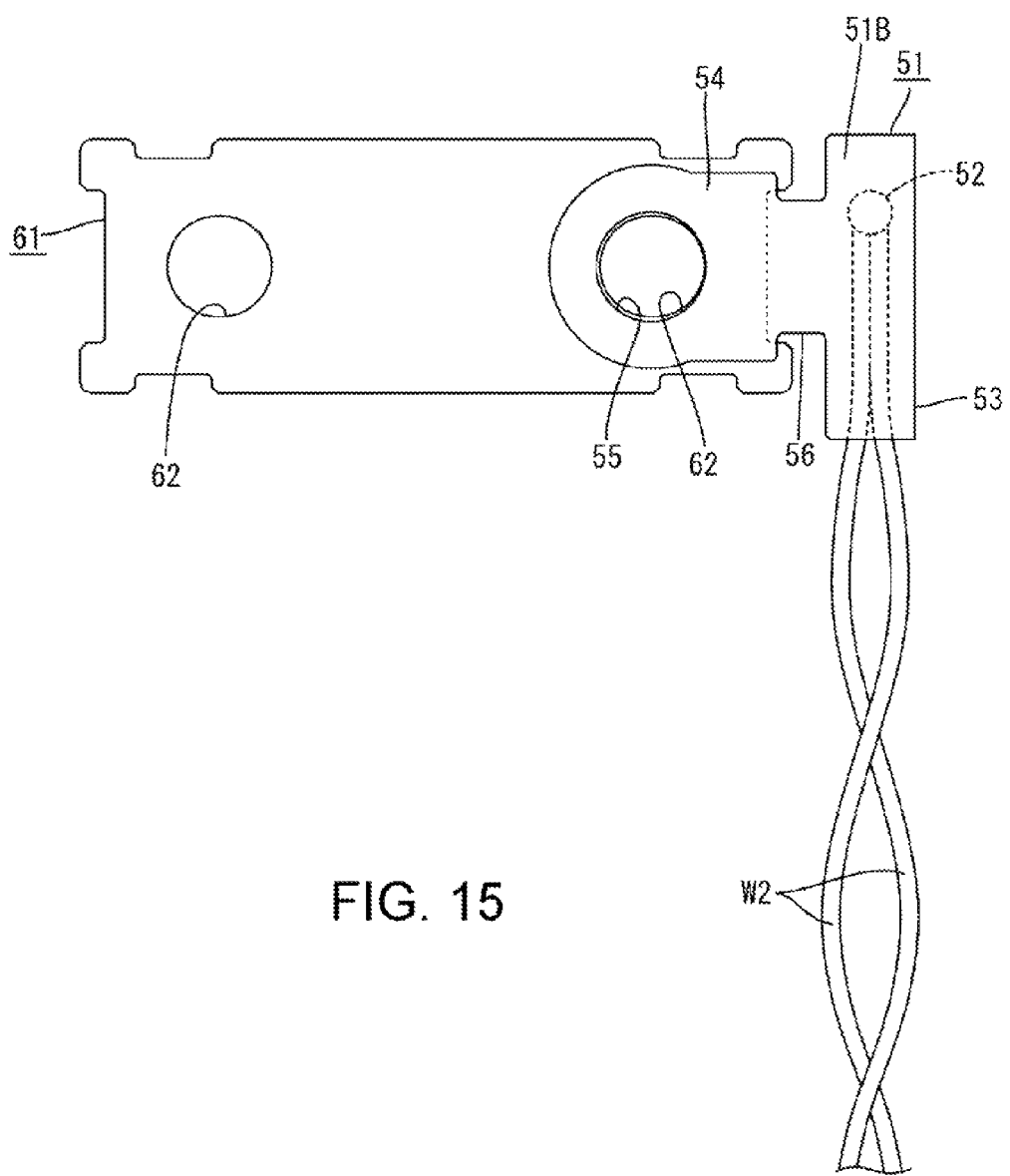
FIG. 15 is a partial plan view illustrating the case of use where the temperature detecting member illustrated in FIG. 14 is reversed.

Note that FIG. 14 shows a connection member 61 in which the temperature detecting member 51 arranged on the right side of FIG. 13 is arranged, and FIG. 15 shows a connection member 61 in which the temperature detecting member 51 arranged on the left side of FIG. 13 is arranged.

When the wiring module 60 of the present embodiment is assembled, using the same method as in Embodiment 1, the connection members 61 and the connectors 40 are attached to the insulating protector 63, and the electric wires W1 are accommodated in the electric wire accommodating grooves 27.

Then, the temperature detecting members 51 are attached. While the element accommodating sections 53 of the temperature detecting members 51 are positioned so as to align with the corresponding receiving groove 71 and the terminal insertion holes 55 of the detection sections are arranged so as to overlap the terminal through-holes 62 of the connection members 61, the held sections 56 are fitted into the detection member holding sections 64B of the insulating protector 63. Then, electric wires W2 connected to the temperature detecting elements 52 are led out from the electric wire leading holes 78 of the receiving grooves 71, and are arranged in the detecting wire accommodation sections 77.

Then, the held sections 56 are fitted into the detection member holding sections 64B of the insulating protector 63, the element accommodating sections 53 are received in the receiving grooves 71, and detection sections 54 and the connection members 61 are brought into surface-contact (areal contact) with each other.

Then, the flap sections 73 are folded at the hinges 72 to close the detecting wire accommodation sections 77 and the receiving grooves 71. The pressing projections 75 of the element pressing sections 74 that cover the upper side of the receiving grooves 71 are latched into the flap latching recesses 79, thereby restricting the (upward) movements of the element accommodating sections 53 of the temperature detecting members 51 (see FIG. 12). Then, by latching the lock protrusions 76 of the flap sections 73 into the flap latching holes 70, the temperature detecting members 51 are retained, as shown in FIG. 12.

The wiring module 60 thus assembled is attached to the single cell group 10 by the same method as that of Embodiment 1, and thus the battery module M2 is completed.

Hereinafter, the functions and effects of the present embodiment will be described. In the present embodiment, in order to install the temperature detecting member 51, the detection section 54 of the temperature detecting member 51 is arranged so as to be in contact to the connection member 61 serving as a detection target, and the element accommodating section 53 is arranged perpendicular to the line X connecting the shaft centers P of the electrode terminals 12A and 12B that are connected to each other by the connection member 61.

In other words, also according to the present embodiment, after the connection members 61 are held by the insulating protector 63, the temperature detecting members 51 can be installed at desired positions, thus achieving a high degree of freedom in the positions at which the temperature detecting members 51 are installed, the number thereof, and the like.

Furthermore, according to the present embodiment, since the element accommodating section 53 is arranged perpendicular to the line X connecting the shaft centers P of the electrode terminals 12A and 12B, it is possible to arrange the electric wires W2 outside the connection member holding sections 64, suppressing an increase in size of the connection member holding sections 64.

Furthermore, also according to the present embodiment, the detection section 54 of the temperature detecting member 51 is connected, together with the connection member 61, to the electrode terminals 12A and 12B, thus achieving an excellent work efficiency of the connecting procedure.

Furthermore, also according to the present embodiment, since the insulating protector 63 is provided with the receiving grooves 71 that receive the element accommodating section 53 so that the detection section 54 is arranged in surface-contact with the connection member 61, it is possible to prevent the temperature detection accuracy from being deteriorated.

Moreover, according to the present embodiment, since the temperature detecting member 51 has a configuration in which the detection section 54 is plate-shaped, and when one surface 54A of the detection section 54 is arranged on the connection member 61 side, the detection section 54 and the connection member 61 can be brought into contact with each other, and when the other surface 54B of the detection section 54 that is opposite to the one surface 54A is arranged on the connection member 61 side, the detection section 54 and the connection member 61 can be brought into contact with each other, it is possible to use the temperature detecting member 51 in both cases where the one surface 54A of the detection section 54 is arranged on the connection member 61 side and where the opposite surface 54B of the detection section 54 is arranged on the connection member 61 side. This eliminates the need to prepare various types of temperature detecting members 51 taking into consideration the arrangement position, the direction in which the electric wires W2 are routed, or the like.

Other Embodiments

The present application is not limited to the embodiments described with reference to the foregoing description and the drawings, and the technical scope of the present application may include, for example, the following embodiments.

(1) Although the foregoing embodiments show the wiring module 20 in which the element accommodating section 53 is arranged in parallel to the line connecting the shaft centers P of two electrode terminals 12A and 12B that are connected to each other by the connection member 21, a configuration is also possible in which the element accommodating section is arranged perpendicular to the line connecting the shaft centers of two electrode terminals that are connected to each other by the connection member.

(2) Although the foregoing embodiments show the temperature detecting member 51 that is made from a metal plate material, the temperature detecting member 51 may be a temperature detecting member having the element accommodating section and the detection section that are made from a resin material.

(3) Although the foregoing embodiments show the insulating protector 23 that is provided with the receiving groove 31, the insulating protector may be an insulating protector without the receiving groove.

(4) Although the foregoing embodiments show examples in which the temperature detecting members 51 are installed in the direction shown in FIG. 6, the temperature detecting members 51 may be installed in the direction shown in FIG. 10. Alternatively, the temperature detecting members are installed in both the directions shown in FIGS. 6 and 10.

Further, although specific embodiments have been illustrated and described herein, those of ordinary skill in the art appreciate that any arrangement which is calculated to achieve the same purpose may be substituted for the specific embodiments shown and that embodiments of the invention have other applications in other environments. The present application is intended to cover any adaptations or variations of the present inventions.

The following claims are in no way intended to limit the scope of embodiments of the invention to the specific embodiments described herein.

LIST OF REFERENCE NUMERALS

M1, M2 . . . Battery module (power storage module)
10 . . . Single cell group (power storage element group)
11 . . . Cell pack (power storage element)
12A, 12B . . . Electrode terminal
20, 60 . . . Wiring module
21, 61 . . . Connection member
23, 63 . . . Insulating protector
24, 64 . . . Connection member holding section
24A, 64A . . . Outer wall
24B, 64B . . . Detection member holding section
31, 71 . . . Receiving groove
51 . . . Temperature detecting member
52 . . . Temperature detecting element
53 . . . Element accommodating section
54 . . . Detection section
54A . . . One surface of detection section
54B . . . Opposite surface of detection section
55 . . . Terminal insertion hole
56 . . . Held section
P . . . Shaft center (of electrode terminal)
W2 . . . Electric wire
X . . . Line connecting shaft centers of adjacent electrode terminals

The invention claimed is:

1. A wiring module to be attached to a power storage element group in which a plurality of power storage elements are lined up, each power storage element having a positive electrode terminal and a negative electrode terminal, the wiring module comprising:
an insulating protector configured to hold a connection member that electrically connects adjacent electrode terminals; and
a temperature detecting member configured to detect a temperature of the connection member,
wherein the temperature detecting member includes:
a temperature detecting element;
an electric wire connected to the temperature detecting element;
an element accommodating section in which the temperature detecting element is accommodated and through which the electric wire is led out; and
a detection section that is contiguous to the element accommodating section and that is arranged to be in contact with the connection member, and
the element accommodating section being arranged in parallel or perpendicular to a line connecting shaft centers of the two electrode terminals that are connected to each other by the connection member,
wherein the insulating protector is provided with a receiving groove that receives the element accommodating section so that the detection section is arranged in a real contact with a connection member.

2. The wiring module according to claim 1,
wherein the detection section is plate-shaped, and the temperature detecting member is configured such that, when one surface of the detection section is arranged on the connection member side, the detection section and the connection member are capable of being in contact with each other, and when the other surface opposite to the one surface of the detection section is arranged on the connection member side, the detection section and the connection member are also capable of being in contact with each other.

3. The wiring module according to claim 1,
wherein the element accommodating section is arranged in parallel to the line.

4. The wiring module according to claim 1,
wherein the element accommodating section is arranged perpendicular to the line.

5. A wiring module to be attached to a power storage group in which a plurality of power storages are lined up, each power storage having a positive electrode terminal and a negative electrode terminal, the wiring module comprising:
a connector that electrically connects adjacent electrode terminals of the power storage group;
an insulating protector that holds the connector; and
a temperature detector that detects a temperature of the connector,
wherein the temperature detector includes:
a temperature detecting element;
an electric wire connected to the temperature detecting element;
an element accommodating section in which the temperature detecting element is accommodated and through which the electric wire is led out; and
a detection section that is contiguous to the element accommodating section and that is arranged to be in contact with the connector, and
the element accommodating section has an elongated shape elongating in a first direction that is in parallel or perpendicular to a line connecting shaft centers of the two electrode terminals that are connected to each other by the connector, the element accommodating section having two ends apart from each other in the first direction and receiving the electric wire at one of the two ends,
wherein the insulating protector includes a receiving groove that receives the element accommodating section so that the detection section is arranged in area contact with the connector.

6. The wiring module according to claim 5,
wherein the detection section is plate-shaped, and the temperature detector is configured such that, when one surface of the detection section is arranged to face the connector, the detection section and the connector are capable of being in contact with each other, and when the other surface opposite to the one surface of the detection section is arranged to face the connector, the detection section and the connector are also capable of being in contact with each other.

* * * * *